(12) United States Patent
Horio et al.

(10) Patent No.: US 7,990,617 B2
(45) Date of Patent: Aug. 2, 2011

(54) OPTICAL LAMINATE COMPRISING LOW-REFRACTIVE INDEX LAYER

(75) Inventors: Tomoyuki Horio, Nagareyama (JP); Hiroaki Omori, Higashihiroshima (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 127 days.

(21) Appl. No.: 12/294,694

(22) PCT Filed: Mar. 28, 2007

(86) PCT No.: PCT/JP2007/056686
§ 371 (c)(1),
(2), (4) Date: Jan. 26, 2009

(87) PCT Pub. No.: WO2007/119566
PCT Pub. Date: Oct. 25, 2007

(65) Prior Publication Data
US 2010/0020398 A1     Jan. 28, 2010

(30) Foreign Application Priority Data

Mar. 28, 2006   (JP) ................................ 2006-088742

(51) Int. Cl.
*G02B 1/10* (2006.01)
(52) U.S. Cl. ........ 359/586; 528/405; 528/401; 528/425; 428/413; 428/419; 428/423.1; 428/451; 428/522
(58) Field of Classification Search ............... 428/413, 428/419, 423.1, 451, 522; 359/586; 528/405, 528/401, 425
See application file for complete search history.

(56) References Cited

U.S. PATENT DOCUMENTS

| | | | | |
|---|---|---|---|---|
| 5,449,558 | A * | 9/1995 | Hasegawa et al. | 428/422 |
| 6,383,620 | B1 * | 5/2002 | Aoyama et al. | 428/212 |
| 6,511,721 | B1 * | 1/2003 | Murata et al. | 428/1.3 |
| 6,589,650 | B1 | 7/2003 | Govek et al. | |
| 6,660,388 | B2 | 12/2003 | Liu et al. | |
| 6,660,389 | B2 | 12/2003 | Liu et al. | |
| 6,777,070 | B1 | 8/2004 | Murata et al. | |
| 6,902,791 | B2 * | 6/2005 | Kawasato et al. | 428/141 |
| 7,125,926 | B2 * | 10/2006 | Satoh et al. | 524/502 |
| 2002/0077451 | A1 * | 6/2002 | Sakano et al. | 528/392 |
| 2003/0027732 | A1 * | 2/2003 | Howell et al. | 508/579 |
| 2004/0156110 | A1 * | 8/2004 | Ikeyama | 359/603 |
| 2005/0129852 | A1 * | 6/2005 | Baudin et al. | 427/301 |
| 2005/0197408 | A1 * | 9/2005 | Shirakawa et al. | 514/723 |
| 2008/0138606 | A1 * | 6/2008 | Yoshihara et al. | 428/327 |

FOREIGN PATENT DOCUMENTS

| | | |
|---|---|---|
| CN | 1446371 | 10/2003 |
| JP | 11-129382 A1 | 5/1999 |
| JP | 2000-187102 A1 | 7/2000 |
| JP | 2002-293762 A1 | 10/2002 |
| JP | 2004-069983 * | 7/2004 |
| JP | 2005-313593 A1 | 11/2005 |
| JP | 2006-049296 A1 | 2/2006 |
| JP | 2007-016082 * | 8/2007 |
| WO | 2005/063484 | 7/2005 |
| WO | 2005/097483 A1 | 10/2005 |

OTHER PUBLICATIONS

STIC database search of the formula in instant claim 1.*

* cited by examiner

*Primary Examiner* — Angela Ortiz
*Assistant Examiner* — Michael B Nelson
(74) *Attorney, Agent, or Firm* — Burr & Brown

(57) ABSTRACT

The present invention discloses an optical laminate comprising a light-transparent base material and a low-refractive index layer provided on the light-transparent base material, the low-refractive index layer simultaneously having both contamination preventive properties and slipperiness. The optical laminate comprises a light-transparent base material, and a hard coat layer and a low-refractive index layer provided in that order on the light-transparent base material, wherein the low-refractive index layer contains a contamination preventive agent and/or a slipperiness imparting agent, and contamination preventive agent and/or slipperiness imparting agent are added so that the concentrations of the contamination preventive agent and/or slipperiness imparting agent have a concentration gradient from the surface of the hard coat layer toward the surface of the low-refractive index layer.

20 Claims, No Drawings

OPTICAL LAMINATE COMPRISING LOW-REFRACTIVE INDEX LAYER

CROSS-REFERENCE TO RELATED APPLICATION

This application is based upon and claims the benefit of priority from the prior Japanese Patent Applications No. 88742/2006 under the Paris Convention, and, thus, the entire contents thereof are incorporated herein by reference.

FIELD OF THE INVENTION

The present invention provides an optical laminate comprising at least a low-refractive index layer.

BACKGROUND OF THE INVENTION

A reduction in reflection of light applied from an external light source and an enhancement in the visibility of image are required of an image display face in image display devices such as liquid crystal displays (LCDs) or cathode ray tube display devices (CRTs). On the other hand, it is common practice to reduce the reflection from the image display face in the image display device and thus to improve the visibility by utilizing an optical laminate (for example, an antireflection laminate) comprising an antireflection layer provided on a light transparent base material.

The prevention of lowered contrast and lowered visibility caused by external light reflection or image reflection is required of image display devices, for example, cathode ray tube display devices (CRTs), plasma displays (PDPs), organic or inorganic electroluminescent displays (ELDs), field emission displays (FEDs), or liquid crystal displays (LCDs). Accordingly, it is common practice to provide an antireflection laminate on the outermost surface of an image display device from the viewpoint of reducing image reflection or reflectance using the principle of light scattering or the principle of optical interference.

Further, it has hitherto been pointed out that the outermost surface of the optical laminate is exposed to various service environments and thus is likely to be scratched and contaminated. To overcome this drawback, Japanese Patent Laid-Open No. 104403/1998 proposes an optical laminate comprising a hard coat layer in which a contamination preventive agent has been added to the hard coat layer from the viewpoint of improving the scratch resistance and contamination prevention of the image display face.

So far as the present inventors know, however, up to now, any optical laminate comprising a light transparent base material and a low-refractive index layer, provided on the light transparent base material, which can simultaneously realize contamination preventive properties and slipperiness, has not been proposed.

At the time of the present invention, the present inventors have found that a low-refractive index layer, which can simultaneously realize contamination preventive properties and slipperiness, can be formed, when the low-refractive index layer contains a contamination preventive agent and/or a slipperiness imparting agent and, at the same time, the contamination preventive agent and/or the slipperiness imparting agent are added so that the concentrations of the contamination preventive agent and/or slipperiness imparting agent have a gradient from the surface of the hard coat layer toward the surface of the low-refractive index layer. Accordingly, the present invention provides an optical laminate comprising a low-refractive index layer having both contamination preventive properties and slipperiness.

Thus, according to the present invention, there is provided an optical laminate comprising a light transparent base material, and a hard coat layer and a low-refractive index layer provided in that order on the light transparent base material, wherein the low-refractive index layer has a refractive index of not more than 1.45, the low-refractive index layer contains a contamination preventive agent and/or a slipperiness imparting agent, and the contamination preventive agent and/or slipperiness imparting agent are added so that the concentrations of the contamination preventive agent and/or slipperiness imparting agent are increased from the surface of the hard coat layer toward the surface of the low-refractive index layer.

DETAILED DESCRIPTION OF THE INVENTION

I. Optical Laminate

Low-refractive Index Layer

Concentration Gradient

The optical laminate according to the present invention comprises a low-refractive index layer containing a contamination preventive agent and/or a slipperiness imparting agent, and the amounts of the contamination preventive agent and/or the slipperiness imparting agent added are such that the concentrations of the contamination preventive agent and/or slipperiness imparting agent are increased from the surface of the hard coat layer toward the surface of the low-refractive index layer. That is, in the present invention, the contamination preventive agent and/or slipperiness imparting agent are added so as to provide a concentration gradient from the surface of the hard coat layer to the surface of the low-refractive index layer.

In a preferred embodiment of the present invention, the concentration gradient can be explained by the face that, when the outermost surface of the low-refractive index layer is analyzed by XPS, the percentage presence of the constituent atoms (for example, silicon atom and/or fluorine atom) in the contamination preventive agent and/or the slipperiness imparting agent is a specific numerical value. The "XPS" analysis is a method for analyzing elements and composition on the surface of a sample by X-ray photoelectron spectroscopy. The XPS analysis may be carried out, for example, with an XPS (X-ray photoelectron spectroscopy) apparatus manufactured by Thermo Electron Corporation (VG Theta Probe) under conditions of X-ray source: monochromated AlKα, X-ray output: 100 W, measuring region: 400 μmφ, lens: angle resolved, and measuring angle: four stages (31°, 46°, 61°, and 76°).

For example, in the XPS analysis, a measuring angle of 90° means that the XPS apparatus is located at a right angle to the outermost surface of the optical laminate. When the measuring angle is lower, the proportion of elements present at a part which is nearer the outermost surface can be measured. Accordingly, the percentage presence of the silicon atom and/or the fluorine atom in the contamination preventive agent and/or the slipperiness imparting agent at a measuring angle of X° is measured as A %, and the percentage presence of the silicon atom and/or the fluorine atom in the contamination preventive agent and/or the slipperiness imparting agent at a measuring angle of Y° is measured as B %. From the above measurement results, when measuring angle X°<measuring angle Y° and percentage presence A %>percentage presence B %, it can be understood that there is "concentration gradient" of the contamination preventive agent and/or the slipperiness imparting agent from the surface of the hard coat layer to the surface of the low-refractive index layer.

In the present invention, when the outermost surface of the low-refractive index layer is analyzed by XPS, the percentage presence of silicon atoms is not less than 10%, preferably not less than 20%, and/or the percentage presence of fluorine atoms is not less than 20%, preferably not less than 30%.

Contamination Preventive Agent and/or Slipperiness Imparting Agent

The contamination preventive agent and/or the slipperiness imparting agent are mainly used for preventing the contamination of the outermost surface of the optical laminate and can impart scratch resistance to the optical laminate. Specific examples of the contamination preventive agent and/or the slipperiness imparting agent include fluorocompounds, silicon compounds, or mixtures of these compounds. The contamination preventive agent and/or the slipperiness imparting agent per se may or may not contain a reactive group.

In the present invention, preferably, the end or side chain of the silicon compound has been modified. Such silicon compounds include those represented by general formulae (I) to (III) or (IV):

[Chemical formula 1]

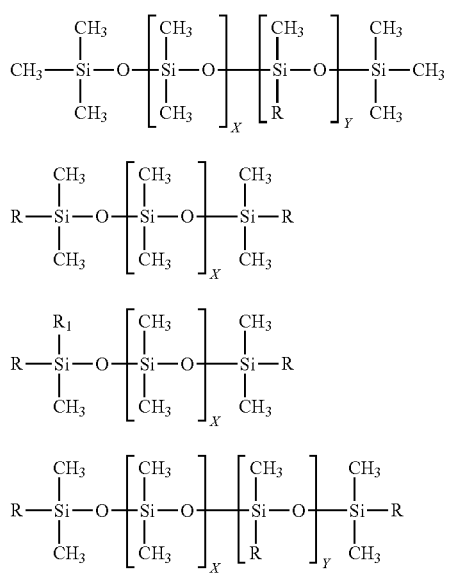

wherein

R represents a hydrophobic group, that is, a methyl group, a fluorine atom, an acryl group, or a methacryl group, a hydrophilic group, that is, a hydroxyl group, a carboxyl group, a polyether group, or an epoxy group, or a mixed group of these groups;

$R_1$ represents an alkyl group, preferably an alkyl group having 1 to 20 carbon atoms, more preferably an alkyl group having 1 to 10 carbon atoms;

X is 0 to 1200; and

Y is 0 to 1200.

Specific examples of fluorocompounds include those represented by general formula:

(A)$w$-(B)$x$-(D)$y$-CF$_3$ wherein

A represents one or at least two groups selected from the group consisting of $CF_2$, $CFCF_2$, and $C(CF_2)_2$;

B represents one or at least two groups selected from the group consisting of $OCF_2CF_2$, $OCF_2CF(CF_2)$, $OCF_2C(CF_2)_2$, $OCF(CF_2)CF(CF_2)$, $OCF(CF_2)C(CF_2)_2$, $OC(CF_2)_2CF(CF_2)$, and $OC(CF_2)_2C(CF_2)_2$;

D represents one or at least two groups selected from the group consisting of $OCH_2CH_2$, $OCH_2CH_2CH_2$, and $OC(O)(CH_2)z$; and w, x, y, and z are a number of more than 0 and not more than 50.

The contamination preventive agent and/or the slipperiness imparting agent are commercially available and are preferably utilizable. Specific examples of the contamination preventive agent and/or the slipperiness imparting agent not containing a group which is reactive upon exposure to an ionizing radiation, include Megafac Series manufactured by Dainippon Ink and Chemicals, Inc., for example, Megafac F350-5, Megafac F445, Megafac F455, Megafac F178, Megafac F470, Megafac F475, Megafac F479, Megafac F477, Megafac TF1025, Megafac F478, and Megafac F178K; TSF Series and the like manufactured by GE Toshiba Silicones; X22 Series, KF Series and the like manufactured by The Shin-Etsu Chemical Co., Ltd.; and Silaplane Series and the like manufactured by Chisso Corp.

Examples thereof include X22-3710, X22-162C, X22-3701E, X22160AS, X22170DX, X224015, X22176DX, X22-176F, KF8001, X22-2000 and the like manufactured by The Shin-Etsu Chemical Co., Ltd.; Silaplane FM4421, Silaplane FM0425, Silaplane FMDA26, Silaplane FS1265 and the like manufactured by Chisso Corp.; BY16-750, BY16880, BY16848, SF8427, SF8421, SH3746, SH8400, SF3771, SH3749, SH3748, SH8410 and the like manufactured by Dow Corning Toray Co., Ltd.; and TSF4460, TSF4440, TSF4445, TSF4450, TSF4446, TSF4453, TSF4452, TSF4730, TSF4770, FGF502 and the like manufactured by GE Toshiba Silicones.

Specific examples of the contamination preventive agent and/or the slipperiness imparting agent containing a group which is reactive upon exposure to an ionizing radiation, include SUA 1900L10 (weight average molecular weight 4200; manufactured by Shin-Nakamura Chemical Co., Ltd.), SUA 1900L6 (weight average molecular weight 2470; manufactured by Shin-Nakamura Chemical Co., Ltd.), Ebecryl 1360 (manufactured by Daicel UCB Co.), UT 3971 (manufactured by The Nippon Synthetic Chemical Industry Co., Ltd.), Diffencer TF 3001 (manufactured by Dainippon Ink and Chemicals, Inc.), Diffencer TF 3000 (manufactured by Dainippon Ink and Chemicals, Inc.), Diffencer TF 3028 (manufactured by Dainippon Ink and Chemicals, Inc.), KRM 7039 (manufactured by Daicel UCB Co.), LIGHT PROCOAT AFC 3000 (manufactured by Kyoeisha Chemical Co., Ltd.), KNS 5300 (manufactured by Shin-Etsu Silicone), UVHC 1105 (manufactured by GE Toshiba Silicones), UVHC 8550 (manufactured by GE Toshiba Silicones), Ebecryl 350 (manufactured by Daicel UCB Co.), and ACS-1122 (manufactured by Nippon Paint Co., Ltd.).

Examples thereof include X22-163A, X22-173DX, X22-163C, KF101, X22164A, X24-8201, X22174DX, X22164C, X222426, X222445, X222457, X222459, X22245, X221602, X221603, X22164E, TM0701 and the like manufactured by The Shin-Etsu Chemical Co., Ltd.; Silaplane FM0725, Silaplane FM0721, Silaplane FM7725, Silaplane FM7721, Silaplane FM7726, Silaplane FM7727 and the like manufactured by Chisso Corp.; SF8411, SF8413, BY16-152D, BY16-152, BY16-152C, 8388A and the like manufactured by Dow Corning Toray Co., Ltd.; and other products such as UT4315 (manufactured by Nippon Synthetic Chemical Industry Co., Ltd.).

When the contamination preventive agent and/or the slipperiness imparting agent are an organic compound, the number average molecular weight is not limited but is generally not less than 500 and not more than 100,000. Preferably, the lower limit of the number average molecular weight is 750, more preferably 1000, and the upper limit of the number average molecular weight is 70,000, more preferably 50,000.

In a preferred embodiment of the present invention, the contamination preventive agent and/or the slipperiness imparting agent contain a difunctional or higher polyfunctional acrylate group containing a polyorganosiloxane group, a polyorganosiloxane-containing graft polymer, a polyorganosiloxane-containing block copolymer, a fluorinated alkyl group or the like. Polyfunctional acrylates include, for example, difunctional acrylates, for example, tripropylene glycol di(meth)acrylate, polypropylene glycol di(meth)acrylate, diethylene glycol di(meth)acrylate, polyethylene glycol di(meth)acrylate, 1,3-butanediol di(meth)acrylate, 1,4-butanediol di(meth)acrylate, ethoxylated bisphenol A di(meth)acrylate, ethoxylated bisphenol F di(meth)acrylate, 1,6-hexanediol di(meth)acrylate, 1,9-nonanediol di(meth)acrylate, 1,10-decanediol di(meth)acrylate, glycerin di(meth)acrylate, neopentyl glycol di(meth)acrylate, propoxylated neopentyl glycol di(meth)acrylate, pentaerithritol diacrylate monostearate, isocyanuric acid ethoxy-modified di(meth)acrylate (isocyanuric acid EO-modified di(meth)acrylate), difunctional urethane acrylate, and difunctional polyester acrylate. Trifunctional acrylates include, for example, pentaerithritol tri(meth)acrylate, trimethylolpropane tri(meth)acrylate, trimethylolpropane EO-modified tri(meth)acrylate, isocyanuric acid EO-modified tri(meth)acrylate, ethoxylated trimethylolpropane tri(meth)acrylate, propoxylated trimethylolpropane tri(meth)acrylate, propoxylated glyceryl tri(meth)acrylate, and trifunctional polyester acrylate. Tetrafunctional acrylates include, for example, pentaerithritol tetra(meth)acrylate, ditrimethylolpropane tetra(meth)acrylate, and ethoxylated pentaerithritol tetra(meth)acrylate. Pentafunctional or higher acrylates include dipentaerithritol hydroxy penta(meth)acrylate and dipentaerithritol hexaacrylate.

The addition amount of the contamination preventive agent and/or the slipperiness imparting agent are not less than 0.0001% by weight and not more than 10% by weight (preferably not more than 0.5% by weight) based on the total weight of the composition for low-refractive index layer formation. Preferably, the lower limit of the addition amount of the contamination preventive agent and/or the slipperiness imparting agent is 0.001% by weight, more preferably 0.005% by weight, and the upper limit of the addition amount of the contamination preventive agent and/or the slipperiness imparting agent is 7% by weight (preferably 0.25% by weight), more preferably 5% by weight (preferably 0.1% by weight).

Low-refractive Index Agent

The low-refractive index agent preferably has preferably a refractive index of not more than 1.5, more preferably not more than 1.45. The low-refractive index agent may be of an inorganic type or organic type.

In a preferred embodiment of the present invention, when external light (for example, light from a fluorescent lamp and natural light) is reflected from the surface of the optical laminate, the low-refractive index layer functions to lower the reflectance. The low-refractive index agent is preferably any one of, for example, 1) a silica- or magnesium fluoride-containing material, 2) a fluorocompound which is a low-refractive index resin, 3) a silica- or magnesium fluoride-containing fluoro material, and 4) a thin film of silica or magnesium fluoride. Regarding the materials other than the fluoro material, the same material as the material constituting the hard coat layer may be used. The low-refractive index layer may be formed of a low-refractive index agent and a resin. The low-refractive index layer has a refractive index of not more than 1.45, particularly preferably not more than 1.42.

Inorganic Low-refractive Index Agent

The low-refractive index layer may be formed of silica or magnesium fluoride, preferably void-containing fine particles of the material. "Void-containing fine particles" can lower the refractive index while maintaining the layer strength of the low-refractive index layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles produced by using a technique disclosed in Japanese Patent Laid-Open No. 233611/2001. Void-containing silica fine particles can easily be produced and as such have high hardness. Therefore, when a low-refractive index layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP Series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the low-refractive index layer.

Organic Low-refractive Index Agent

The low-refractive index agent may be a low-refractive index resin, and examples thereof include silicone-containing vinylidene fluoride copolymers. The silicone-containing vinylidene fluoride copolymer is specifically produced by the copolymerization of a monomer composition containing vinylidene fluoride and hexafluoropropylene as a starting material. The copolymer comprises 100 parts of a fluorine-containing copolymer having a fluorine content of 60 to 70% and 80 to 150 parts of a polymerizable compound containing an ethylenically unsaturated group.

In the silicone-containing vinylidene fluoride copolymer, regarding the proportion of each component in the monomer composition, the content of vinylidene fluoride is 30 to 90%, preferably 40 to 80%, particularly preferably 40 to 70%, and the content of hexafluoropropylene is 5 to 50%, preferably 10 to 50%, particularly preferably 15 to 45%. The monomer composition may further comprise 0 to 40%, preferably 0 to 35%, particularly preferably 10 to 30%, of tetrafluoroethylene.

In the silicone-containing vinylidene fluoride copolymer, other comonomer component may be contained in an amount of, for example, not more than 20%, preferably not more than 10%. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition should be 60 to 70%, more preferably 62 to 70%, particularly preferably 64 to 68%. When the fluorine content is in the above-defined specific range, the fluorine-containing copolymer has good solubility in solvents. The incorporation of the fluorine-containing copolymer as a component can realize the formation of a thin film having excellent adhesion to various base materials, a high level of transparency, a low refractive index, and satisfactory mechanical strength and thus can render mechanical properties such as scratch resistance of the surface with the thin film formed thereon satisfactorily high and is very advantageous.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability. The refractive index of the fluorine-containing copolymer per se is preferably not more than 1.45, more preferably not more than 1.42, still more preferably not more than 1.40.

Other Low-refractive Index Agents

In the present invention, preferred low-refractive index agents include low-refractive index inorganic ultrafine particles such as silica and magnesium fluoride (all types of fine particles such as porous and hollow fine particles), and fluororesins which are low-refractive index resins. Polymerizable compounds containing a fluorine atom at least in their molecule, or polymers thereof are usable as the fluororesin. The polymerizable compound is not particularly limited. However, for example, those containing a curing reactive group such as a functional group curable by an ionizing radiation or a heat curable polar group are preferred. Further, compounds simultaneously having these reactive groups are also possible. Unlike the polymerizable compounds, the polymer does not have the above reactive groups at all.

Ethylenically unsaturated bond-containing fluorine-containing monomers are extensively usable as the polymerizable compound having an ionizing radiation curing group. More specific examples thereof include fluoroolefins (for example, fluoroethylene, vinylidene fluoride, tetrafluoroethylene, hexafluoropropylene, perfluorobutadiene, and perfluoro-2,2-dimethyl-1,3-dioxol). Specific examples of (meth) acryloyloxy group-containing compounds include (meth) acrylate compounds having a fluorine atom in their molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl) ethyl (meth)acrylate, methyl α-trifluoromethacrylate, and ethyl α-trifluoromethacrylate; and fluorine-containing polyfunctional (meth)acrylic ester compounds containing a fluoroalkyl, fluorocycloalkyl, or fluoroalkylene group which contains at least three fluorine atoms and has 1 to 14 carbon atoms and at least two (meth)acryloyloxy groups in their molecule.

Preferred heat curing polar groups include, for example, hydrogen bond forming groups such as hydroxyl, carboxyl, amino, and epoxy groups. These groups are excellent in adhesion to the coating film, as well as in affinity for inorganic ultrafine particles such as silica. Heat curing polar group-containing polymerizable compounds include, for example, 4-fluoroethylene-perfluoroalkyl vinyl ether copolymers; fluoroethylene-hydrocarbon-type vinyl ether copolymers; and fluorine modification products of resins such as epoxy resins, polyurethane resins, cellulose resins, phenolic resins, and polyimide resins.

Examples of polymerizable compounds containing both an ionizing radiation curing group and a heat curing polar group include partially and fully fluorinated alkyl, alkenyl, and aryl esters of acrylic or methacrylic acid, fully or partially fluorinated vinyl ethers, fully or partially fluorinated vinyl esters, and fully or partially fluorinated vinyl ketones.

Specific examples of fluoropolymers include polymers of a monomer or monomer mixture containing at least one of fluorine-containing (meth)acrylate compounds of the above ionizing radiation curing group-containing polymerizable compounds; copolymers of at least one of the above fluorine-containing (meth)acrylate compounds with (meth)acrylate compounds not containing a fluorine atom in their molecule, for example, methyl (meth)acrylate, ethyl (meth)acrylate, propyl (meth)acrylate, butyl (meth)acrylate, and 2-ethylhexyl (meth)acrylate; and homopolymers or copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene.

Silicone-containing vinylidene fluoride copolymers which are copolymers comprising a silicone component incorporated into the above copolymers may also be used. Silicone components include (poly)dimethylsiloxanes, (poly)diethylsiloxanes, (poly)diphenylsiloxanes, (poly)methylphenylsiloxanes, alkyl-modified (poly)dimethylsiloxanes, azo group-containing (poly)dimethylsiloxanes, dimethyl silicones, phenylmethyl silicones, alkyl/aralkyl-modified silicones, fluorosilicones, polyether-modified silicones, fatty acid ester-modified silicones, methyl hydrogen silicones, silanol group-containing silicones, alkoxy group-containing silicones, phenol group-containing silicones, methacryl-modified silicones, acryl-modified silicones, amino-modified silicones, carboxylic acid-modified silicones, carbinol-modified silicones, epoxy-modified silicones, mercapto-modified silicones, fluorine-modified silicones, and polyether-modified silicones. Among others, those having a dimethylsiloxane structure are preferred.

Nonpolymers or polymers of the following compounds are also usable as the fluororesin. Specific examples thereof include compounds produced by reacting a fluorine-containing compound containing at least one isocyanate group in the molecule thereof with a compound containing in its molecule at least one functional group reactive with the isocyanate group, for example, an amino group, a hydroxyl group, or a carboxyl group; and compounds produced by reacting a fluorine-containing polyol such as a fluorine-containing polyether polyol, a fluorine-containing alkyl polyol, a fluorine-containing polyester polyol, or a fluorine-containing ε-caprolactone-modified polyol with an isocyanate group-containing compound.

Further, the above fluorine atom-containing polymerizable compound and polymer may be used as a mixture with each resin component as described above in connection with the anti-dazzling layer. Furthermore, curing agents for curing reactive groups and the like and various additives and solvents for improving coatability or imparting contamination preventive properties may be properly used.

Resin

The resin is preferably transparent, and specific examples thereof are classified into three resins, that is, ionizing radiation curing resins which are curable upon exposure to ultraviolet light or electron beams, mixtures of ionizing radiation curing resins with solvent drying-type resins, and heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional or polyfunctional monomers such as ethyl (meth)acrylate, ethylhexyl (meth)acrylate, styrene, methylstyrene, and N-vinylpyrrolidone, for example, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

Photopolymerization Initiator

In the present invention, preferred photopolymerization initiators to be added to the ionizing radiation curing resin composition include, for example, acetophenones, benzophenones, Michler's benzoyl benzoate, α-amyloxime ester, tetramethylthiuram monosulfide, and thioxanthones. If necessary, photosensitizers and photopolymerization accelerators are added to the ionizing radiation curing resin composition. Conventional photosensitizers and photopolymerization accelerators may be used as the photosensitizer and photopolymerization accelerator, and examples thereof include benzoin compounds such as benzoin, benzoin methyl ether, benzoin ethyl ether, benzoin isopropyl ether, α-methylbenzoin, and α-phenylbenzoin; anthraquinone compounds such as anthraquinone and methylanthraquinone; benzyl; diacetyl; phenyl ketone compounds such as acetophenone and benzophenone; sulfide compounds such as diphenyl disulfide and tetramethylthiuram sulfide; α-chloromethyl naphthalene; anthracene; halogenated hydrocarbons such as hexachlorobutadiene and pentachlorobutadiene; thioxanthone; n-butylamine; triethylamine; and tri-n-butylphosphine. Specifically, benzophenon or thioxanthone photosensitizers are preferred as the acetophenone photopolymerization initiators.

When the ionizing radiation curing resin is an ultraviolet curing resin, a photopolymerization initiator is preferably used. Specific examples of photopolymerization initiators include acetophenones, benzophenones, Michler's benzoyl benzoate, α-amyloxime ester, and thioxanthones. Preferably, photosensitizers are mixed in the system. Specific examples of photosensitizers include n-butylamine, triethylamine, and poly-n-butylphosphine.

When ionizing radiation curing resins are used as an ultraviolet curing resin, a photopolymerization initiator or a photopolymerization accelerator may be added. In the case of a radical polymerizable unsaturated group-containing resin system, acetophenones, benzophenones, thioxanthones, benzoins, benzoin methyl ether and the like are used as a photopolymerization initiator either solely or as a mixture of two or more. On the other hand, in the case of a cation polymerizable functional group-containing resin system, aromatic diazonium salts, aromatic sulfonium salts, aromatic idonium salts, metallocene compounds, benzoinsulfonic esters and the like may be used as a photopolymerization initiator either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Commonly exemplified thermoplastic resins are usable. The solvent drying-type resin, when added, can effectively prevent coating film defects of coated face. In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Polymerization Initiator

In the formation of the low-refractive index layer, a photopolymerization initiator may be used. Such compounds are commercially available, and examples thereof include those under the trade designations Irgacure 184, Irgacure 907, Irgacure 369, Irgacure 819, Irgacure 127, and DAROCUR TPO (manufactured by Ciba Specialty Chemicals, K.K.). In the present invention, polymerization accelerators include, for example, SpeedcureMBB and SpeedcurePBZ (manufactured by LAMBSON Fine Chemicals).

Solvent

A composition comprising a solvent mixed in the above components may be utilized for low-refractive index layer formation. Specific examples of solvents include alcohols, for example, isopropyl alcohol, methanol, ethanol, butanol, propanol, and PGME; ketones, for example, methyl ethyl ketone, methyl isobutyl ketone, and cyclohexanone; esters, for example, ethyl acetate, butyl acetate, and PG M EA; halogenated hydrocarbons; and aromatic hydrocarbons, for example, toluene and xylene. A mixture solvent composed of two or more of these solvents may also be used. Preferred are alcohols, ketones, and esters.

Hard Coat Layer

In the present invention, preferably, a hard coat layer is formed between the light transparent base material and the low-refractive index layer. The term "hard coat layer" as used herein refers to a layer having a hardness of "H", or higher as measured by a pencil hardness test specified in JIS 5600-5-4 (1999). The thickness (in a cured state) of the hard coat layer is 0.1 to 100 μm, preferably 0.8 to 20 μm. The hard coat layer comprises a resin and optional components.

Resin

The resin is preferably transparent, and specific examples thereof are classified into three resins, that is, ionizing radiation curing resins which are curable upon exposure to ultraviolet light or electron beams, mixtures of ionizing radiation curing resins with solvent drying-type resins, and heat curing resins. Preferred are ionizing radiation curing resins. In the present invention, inorganic ultrafine particles having a size of approximately 1 nm to 500 nm (for example, surface organic material treated alumina or other metal oxide particles, and colloidal silica) and organic ultrafine particles may be added for hardness regulation purposes.

Specific examples of ionizing radiation curing resins include those containing an acrylate-type functional group, for example, relatively low-molecular weight polyester resins, polyether resins, acrylic resins, epoxy resins, urethane resins, alkyd resins, spiroacetal resins, polybutadiene resins, polythiol polyene resins, oligomers or prepolymers of (meth) acrylates of polyfunctional compounds such as polyhydric alcohols, and reactive diluents.

In another embodiments of the present invention, specific examples of ionizing radiation curing resins include those containing an (meth)acrylate-type functional group, those containing a urethane (meth)acrylate-type functional group, or mixtures of those containing an (meth)acrylate-type functional group with those containing a urethane (meth)acrylate-type functional group.

Examples of ionizing radiation curing resins containing an (meth)acrylate-type functional group include, for example, difunctional acrylates, for example, tripropylene glycol di(meth)acrylate, polypropylene glycol di(meth)acrylate, diethylene glycol di(meth)acrylate, polyethylene glycol di(meth)acrylate, 1,3-butanediol di(meth)acrylate, 1,4-butanediol di(meth)acrylate, ethoxylated bisphenol A di(meth) acrylate, ethoxylated bisphenol F di(meth)acrylate, 1,6-hexanediol di(meth)acrylate, 1,9-nonanediol di(meth)acrylate, 1,10-decanediol di(meth)acrylate, glycerin di(meth)acrylate, neopentyl glycol di(meth)acrylate, propoxylated neopentyl glycol di(meth)acrylate, pentaerithritol diacrylate monostearate, and isocyanuric acid ethoxy-modified di(meth)acrylate (isocyanuric acid EO-modified di(meth) acrylate), trifunctional polyester acrylate, for example, pentaerithritol tri(meth)acrylate, trimethylolpropane tri(meth) acrylate, trimethylolpropane EO-modified tri(meth)acrylate, isocyanuric acid EO-modified tri(meth)acrylate, ethoxylated trimethylolpropane tri(meth)acrylate, propoxylated trimethylolpropane tri(meth)acrylate, and propoxylated glyceryl tri(meth)acrylate, and other acrylate, for example, pentaerithritol tetra(meth)acrylate, ditrimethylolpropane tetra(meth) acrylate, ethoxylated pentaerithritol tetra(meth)acrylate, dipentaerithritol hydroxy penta(meth)acrylate, and dipentaerithritol hexaacrylate.

Ionizing radiation curing resins containing a urethane (meth)acrylate-type functional group may be commercially available products, and examples thereof include Shiko Series manufactured by Nippon Synthetic Chemical Industry Co., Ltd., for example, UV1700B, UV6300B, UV765B, UV7640B, and UV7600B; Artresin Series manufactured by Negami Chemical Industrial Co., Ltd., for example, Artresin HDP, Artresin UN9000H, Artresin UN3320HA, Artresin UN3320HB, Artresin UN3320HC, Artresin UN3320HS, Artresin UN901M, Artresin UN902MS, and Artresin UN903; UA100H, U4H, U4HA, U6H, U6HA, U15HA, UA32P, U6LPA, U324A, U9HAMI and the like manufactured by Shin-Nakamura Chemical Co., Ltd.; Ebecryl Series manufactured by Daicel UCB Co., for example, Ebecryl 1290, Ebecryl 5129, Ebecryl 254, Ebecryl 264, Ebecryl 265, Ebecryl 1259, Ebecryl 1264, Ebecryl 4866, Ebecryl 9260, Ebecryl 8210, Ebecryl 204, Ebecryl 205, Ebecryl 6602, Ebecryl 220, and Ebecryl 4450; Beamset Series manufactured by Arakawa Chemical Industries, Ltd., for example, Beamset 371 and Beamset 577; RQ Series manufactured by Mitsubishi Rayon Co., Ltd.; Unidic Series manufactured by Dainippon Ink and Chemicals, Inc.; DPHA40H (manufactured by Nippon Kayaku Co., Ltd.), CN9006 (manufactured by Sartmer); and CN 968. Among them, preferred are UV1700B (manufactured by Nippon Synthetic Chemical Industry Co., Ltd.), DPHA40H (manufactured by Nippon Kayaku Co., Ltd.), Artresin HDP (manufactured by Negami Chemical Industrial Co., Ltd.), Beamset 371 (manufactured by Arakawa Chemical Industries, Ltd.), Beamset 577 (manufactured by Arakawa Chemical Industries, Ltd.), and U15HA (manufactured by Shin-Nakamura Chemical Co., Ltd.) and the like.

When ionizing radiation curing resins are used as an ultraviolet curing resin, preferably a photopolymerization initiator is used. Specific examples of photopolymerization initiators include acetophenones, benzophenones, Michler's benzoyl benzoate, α-amyloxime ester, tetramethyl thiuram monosulfide, and thioxanthones. Preferably, photosensitizers are mixed in the system. Specific examples of photosensitizers include n-butylamine, triethylamine, and poly-n-butylphosphine. Initiators may be the same as those described above in connection with the low-refractive index layer.

The solvent drying-type resin used as a mixture with the ionizing radiation curing resin is mainly a thermoplastic resin. Commonly exemplified thermoplastic resins are usable. The addition of the solvent drying-type resin can impart flexibility suitable for hard coat layer cracking and curling prevention, or can effectively prevent coating defects of the coated face. In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethyl hydroxyethylcellulose.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Preferred Resins

In the present invention, preferably, the hard coat layer comprises a monomer having a 9,9-bisphenoxy fluorene skeleton containing one or more functional groups and/or a monomer containing two or more sulfur atoms, or those formed therefrom.

In a preferred embodiment of the present invention, the hard coat layer may contain a resin having a high refractive index. Preferred high-refractive index resins include monomers, which have a 9,9-bisphenoxyfluorene skeleton containing one or more functional groups and contain two or more sulfur atoms, and further monomers, oligomers, or polymers having a carbazole skeleton, monomers containing one or more bromine atoms, and monomers containing one or more phenyl, biphenyl, or naphthyl groups. The hard coat layer may contain high-refractive index ultrafine particles for enhancing the refractive index of the hard coat layer. Examples of high-refractive index ultrafine particles include $TiO_2$, $ZrO$, $Al_2O_3$, $In_2O_3$, $ZnO$, $SnO_2$, $Sb_2O_2$, and ITO. These fine particles may have been subjected to any organic surface treatment.

Monomers Having Fluorene Skeleton

Monomers having a 9,9-bisphenoxyfluorene skeleton containing one or more functional groups are those having a 9,9-bisphenoxyfluorene skeleton represented as a base skeleton in general formula (V). Specific examples of monomers having a 9,9-bisphenoxyfluorene skeleton containing one or more functional groups include monomers represented by chemical formula (V):

[Chemical formula 2]

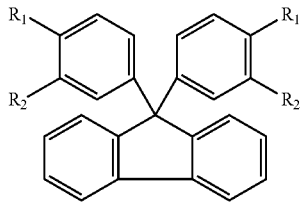

(V)

wherein
$R_1$ is selected from the group consisting of —C(A)=CH$_2$, —CO—C(A)=CH$_2$, —O—CO—C(A)=CH$_2$, —(B)—O—CO—C(A)=CH$_2$, —O—(B)—O—CO—C(A)=CH$_2$, —(B)—C(A)=CH$_2$, —O—(B)—C(A)=CH$_2$, —(B)—CO—C(A)=CH$_2$, —O—(B)—CO—C(A)=CH$_2$, —OH, —H, —COOH, —SH, —NH$_2$.

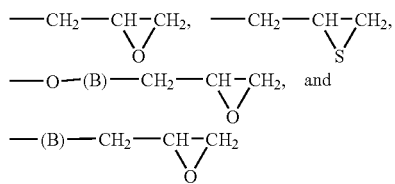

A is H or CH$_3$;
B is selected from the group consisting of (CH$_2$)$_n$, (OCH$_2$CH$_2$)$_n$, (OCH$_2$CH$_2$CH$_2$)$_n$, and (OCOCH$_2$CH$_2$CH$_2$CH$_2$CH$_2$)$_n$;
$R_2$ is selected from a hydrogen atom, hydroxyl group, methyl group, phenyl group, tolyl group, amino group, carboxy group, and —(CH$_2$)$_n$CH$_3$, or R$^-$; and n represents 1 to 20.

Monomers having a 9,9-bisphenoxyfluorene skeleton containing one or more functional groups may be commercially available products, and specific examples thereof include NK Ester A-BPEF, NK Ester A-BPEF-4E (manufactured by Shin-Nakamura Chemical Co., Ltd.), ONCOAT EX Series (ONCOAT EX1010, ONCOAT EX1011, ONCOAT EX1012, ONCOAT EX1020, ONCOAT EX1030, ONCOAT EX1040, ONCOAT EX1050, ONCOAT EX1051, ONCOAT EX1020M80, and ONCOAT EX1040M70), ONCOAT AC2020, biscresolfluorene BCF, BPEFA, BPEF diacrylate, BPEF dimethacrylate, BPEF diglycidyl ether, BPEF epoxy acrylate, BPPF, BPEF vinyl ether, BCF, BCF diglycidyl ether, and BCF epoxy acrylate (manufactured by Nagase & Co., Ltd., Osaka Gas Chemicals Co., Ltd., and JFE Chemical Corporation), bisaniline, and bisphenol skeletons (manufactured by JFE Chemical Corporation).

Monomers Containing Two or More Sulfur Atoms

Any monomer containing two or more sulfur atoms may be used. Preferred are compounds represented by the following general formulae:

[Chemical formula 3]

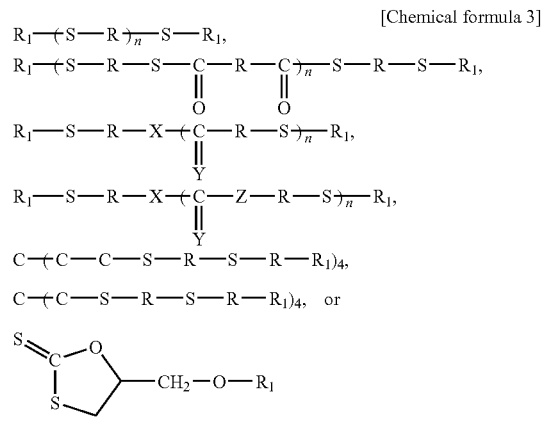

wherein
R is selected from the group consisting of

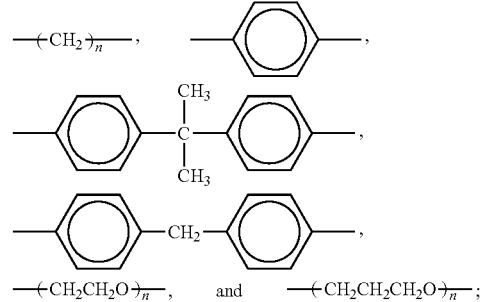

$R_1$ is selected from the group consisting of —C(A)=CH$_2$, —CO—C(A)=CH$_2$, —O—CO—C(A)=CH$_2$, —(B)—O—CO—C(A)=CH$_2$, —O—(B)—O—CO—C(A)=CH$_2$, —(B)—C(A)=CH$_2$, —O—(B)—C(A)=CH$_2$, —(B)—CO—C(A)=CH$_2$, —O—(B)—CO—C(A)=CH$_2$, —OH, —H, —COOH, —SH,

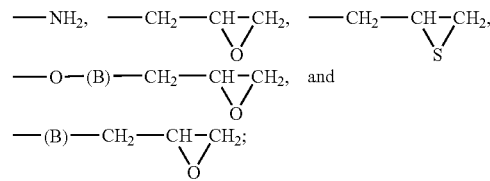

A is H or CH$_3$;
B is selected from the group consisting of (CH$_2$)$_n$, (OCH$_2$CH$_2$)$_n$, (OCH$_2$CH$_2$CH$_2$)$_n$, and (OCOCH$_2$CH$_2$CH$_2$CH$_2$CH$_2$)$_n$;
n is 1 to 20;
X represents O or S;
Y represents O or S; and
Z represents O or S.

In the present invention, monomers containing two or more sulfur atoms may be commercially available products, and specific examples thereof include S2EG, MPSMA, MPS, MPT, BDS, MPV, MPG, PTD and the like (manufactured by Sumitomo Chemical Engineering Co., Ltd.); IUL2000, IUL3000, IUMS1010 and the like (manufactured by Mitsubishi Gas Chemical Co., Inc.); and EGMP-4, TMMP, TEMPIC, PEMP, DPMP and the like (manufactured by Sakai Chemical Co., Ltd.). Among them, S2EG, MPV, and MPSMA are preferred.

In the present invention, preferably, the hard coat layer comprises or is formed of a urethane acrylate resin and/or an acrylate resin.

Urethane Acrylate Resin

Any urethane acrylate resin may be used. However, trifunctional or higher urethane acrylate resins are preferred. Any trifunctional or higher urethane acrylate resin may be used. Specific examples thereof include urethane acrylate resins comprising a polyol compound and a polyisocyanate compound.

Specific examples of polyol compounds include ethylene glycol, propylene glycol, neopentyl glycol, tricyclodecanedimethylol, cyclohexanedimethylol, trimethylolpropane, glycerin, 1,3-propanediol, 1,4-butanediol, 1,3-butanediol, 2,3-butanediol, 1,5-pentanediol, 2,4-pentanediol, 1,2-hexanediol, 1,6-hexanediol, diethylene glycol, tripropylene glycol, 1,9-nonanediol, triethylene glycol, polyethylene glycol, polypropylene glycol, polytetramethylene glycol, bisphenol A polyethoxyl glycol, polycarbonate polyol, pentaerythritol, sorbitol, sucrose, quodrol, polybutadiene polyol, hydrogenated polybutadiene polyol, and hydrogenated dimerdiol pentaerythritol; polyether polyols produced by modifying trihydric or higher compounds such as trimethylolpropane, glycerin, pentaerythritol, sorbitol, sucrose, or quodrol with cyclic ether compounds such as ethylene oxide (EO), propylene oxide (PO), butylene oxide, or tetrahydrofuran; polycaprolactone polyols produced by modification with caprolactone; polyester polyols produced by modification with a polyester comprising a dibasic acid and a diol; and mixtures of two or more of the above compounds.

More specific examples thereof include EO-modified trimethylolpropane, PO-modified trimethylolpropane, tetrahydrofuran-modified trimethylolpropane, caprolactone-modified trimethylolpropane, EO-modified glycerin, PO-modified glycerin, tetrahydrofuran-modified glycerin, caprolactone-modified glycerin, EO-modified pentaerythritol, PO-modified pentaerythritol, tetrahydrofuran-modified pentaerythritol, caprolactone-modified pentaerythritol, EO-modified sorbitol, PO-modified sorbitol, caprolactone-modified sorbitol, PO-modified sucrose, EO-modified sucrose, and EO-modified quodrol, and mixtures of two or more of the above compounds.

Specific examples of polyisocyanate compounds include 2,4-tolylene diisocyanate, 2,6-tolylene diisocyanate, 4,4-diphenylmethane diisocyanate, m-xylylene diisocyanate, p-xylylene diisocyanate, tetramethylxylylene diisocyanate, biphenylene diisocyanate, 1,5-naphthylene diisocyanate, o-tolidine diisocyanate, hexamethylene diisocyanate, 4,4'-methylene biscyclohexyl isocyanate, isophorone diisocyanate, trimethylhexamethylene diisocyanate, 1,3-(isocyanatomethyl)cyclohexane, their biureted products, nurated products or other polycondensation products, and mixtures of two or more of the above compounds. Particularly preferred are nurated products of tolylene diisocyanate, xylylene diisocyanate, and hexamethylene diisocyanate, and nurated products of isophorone diisocyanate. More preferred are hexamethylene diisocyanate and isophorone diisocyanate.

Urethane acrylate resins may be commercially available products, and specific examples thereof include Shiko Series manufactured by Nippon Synthetic Chemical Industry Co., Ltd., for example, UV1700B, UV6300B, UV765B, UV7640B, and UV7600B; Artresin Series manufactured by Negami Chemical Industrial Co., Ltd., for example, Artresin HDP, Artresin UN9000H, Artresin UN3320HA, Artresin UN3320HB, Artresin UN3320HC, Artresin UN3320HS, Artresin UN901M, Artresin UN902MS, and Artresin UN903; UA100H, U4H, U6H, U15HA, UA32P, U6LPA, U324A, U9HAMI and the like manufactured by Shin-Nakamura Chemical Co., Ltd.; Ebecryl Series manufactured by Daicel UCB Co., for example, Ebecryl 1290, Ebecryl 5129, Ebecryl 254, Ebecryl 264, Ebecryl 265, Ebecryl 1259, Ebecryl 1264, Ebecryl 4866, Ebecryl 9260, Ebecryl 8210, Ebecryl 204, Ebecryl 205, Ebecryl 6602, Ebecryl 220, and Ebecryl 4450; Beamset Series manufactured by Arakawa Chemical Industries, Ltd., for example, Beamset 371, Beamset 371S, Beamset 577, Beamset 577BV, and Beamset 577AK; RQ Series manufactured by Mitsubishi Rayon Co., Ltd.; Unidic Series manufactured by Dainippon Ink and Chemicals, Inc.; DPHA40H (manufactured by Nippon Kayaku Co., Ltd.), CN9006 (manufactured by Sartmer), and CN968. Among them, UV1700B (manufactured by Nippon Synthetic Chemical Industry Co., Ltd.), DPHA40H (manufactured by Nippon Kayaku Co., Ltd.), Artresin HDP (manufactured by Negami Chemical Industrial Co., Ltd.), Beamset 371 (manufactured by Arakawa Chemical Industries, Ltd.), U15HA (manufactured by Shin-Nakamura Chemical Co., Ltd.) and the like are preferred.

Acrylate Resin

The above-described acrylate resins may be used. Preferred are trifunctional or higher acrylate resins. Specific examples of trifunctional or higher acrylate resins include trimethylolpropane triacrylate, pentaerythrito triacrylate, pentaerythritol tetraacrylate, dipentaerythritol hexaacrylate, dipentaerythritol tetraacrylate, and isocyanuric acid-modified triacrylate. These acryates may have a molecular skeleton a part of which has been modified. Further, acrylates modified, for example, with ethylene oxide, propylene oxide, caprolactone, isocyanuric acid, alkyl, cyclic alkyl, aromatic compound, and bisphenol may also be used.

The trifunctional or higher acrylate resins may be commercially available products, and specific examples thereof include KAYARAD Series and KAYAMER Series manufactured by Nippon Kayaku Co., Ltd., for example, DPHA, PET30, GPO303, TMPTA, THE330, TPA330, D310, D330, PM2, PM21, DPCA20, DPCA30, DPCA60, and DPCA120; Aronix Series manufactured by TOAGOSEI CO., LTD., for example, Aronix M305, Aronix M309, Aronix M310, Aronix M315, Aronix M320, Aronix M327, Aronix M350, Aronix M360, Aronix M402, Aronix M408, Aronix M450, Aronix M7100, Aronix M7300K, Aronix M8030, Aronix M8060, Aronix M8100, Aronix M8530, Aronix M8560, and Aronix M9050; NK Ester Series manufactured by Shin-Nakamura Chemical Co., Ltd., for example, NK Ester TMPT, NK Ester A-TMPT, NK Ester A-TMM-3, NK Ester A-TMM3L, NK Ester A-TMMT, NK Ester A-TM PT-6EO, NK Ester A-TMPT-3CL, NK Ester A-GLY-3E, NK Ester A-GLY-6E, NK Ester A-GLY-9E, NK Ester A-GLY-11E, NK Ester A-GLY-18E, NK Ester A-GLY-20E, NK Ester A-9300, NK Ester AD-TMP-4CL, and NK Ester AD-TMP; NK ECONOMER Series manufactured by Shin-Nakamura Chemical Co., Ltd., for example, NK ECONOMER ADP51, NK ECONOMER ADP33, NK ECONOMER ADP42, NK ECONOMER ADP26, and NK ECONOMER ADP15; New Frontier Series manufactured by DAI-ICHI KOGYO SEIYAKU CO., LTD., for example, New Frontier TMPT, New Frontier TMP3, New Frontier TMP15, New Frontier TMP2P, New Frontier TMP3P, New Frontier PET3, and New Frontier TEICA; Ebecryl Series manufactured by DAICEL U.C.B. Co., Ltd., for example, Ebecryl TMPTA, Ebecryl TMPTAN, Ebecryl 160, Ebecryl TMPEOTA, Ebecryl OTA480, Ebecryl 53, Ebecryl PETIA, Ebecryl 2047, Ebecryl 40, Ebecryl 140, Ebecryl 1140, Ebecryl PETAK, and Ebecryl DPHA; and CD501, CD9021, CD9052, SR351, SR351HP, SR351LV, SR368, SR368D, SR415, SR444, SR454, SR454HP, SR492, SR499, SR502, SR9008, SR9012, SR9020, SR9020HP, SR9035, CD9051, SR350, SR9009, SE9011, SR295, SR355, SR399, SR399LV, SR494, and SR9041 manufactured by Sartmer.

Solvents

A composition comprising a solvent mixed into the above components may be utilized for low-refractive index layer formation. Specific examples of solvents include alcohols such as isopropyl alcohol, methanol, and ethanol; ketones such as methyl ethyl ketone, methyl isobutyl ketone, and cyclohexanone; esters such as ethyl acetate and butyl acetate; halogenated hydrocarbons; aromatic hydrocarbons such as toluene and xylene; or their mixtures. Preferred are ketones and esters.

Penetrating Solvent

In the present invention, penetrating solvents may also be used. A solvent penetrable into the light transparent base material is utilized. Accordingly, in the present invention, the term "penetrability" in the penetrating solvent embraces all concepts of penetrating, swelling, wetting and other properties in relation to the light transparent base material. Specific examples of penetrating solvents include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons such as chloroform, methylene chloride, and tetrachloroethane; or their mixtures. Preferred are esters and ketones.

Specific examples of penetrating solvents include acetone, methyl acetate, ethyl acetate, butyl acetate, chloroform, methylene chloride, trichloroethane, tetrahydrofuran, methyl ethyl ketone, methyl isobutyl ketone, cyclohexanone, nitromethane, 1,4-dioxane, dioxolane, N-methylpyrrolidone, N,N-dimethylformamide, methanol, ethanol, isopropyl alcohol, butanol, isobutyl alcohol, diisopropyl ether, methylcellosolve, ethylcellosolve, and butylcellosolve. Preferred are methyl acetate, ethyl acetate, butyl acetate, methyl ethyl ketone, cyclohexanone, and the like.

The amount of the penetrating solvent added may be properly determined. For example, the amount of the penetrating solvent added is not less than 0.01 part by weight and not more than 50 parts by weight, based on the total amount of the composition for a hard coat layer. Preferably, the lower limit of the amount of the penetrating solvent added is 0.1 part by weight (more preferably 1 part by weight), and the upper limit of the penetrating solvent added is 25 parts by weight (more preferably 15 parts by weight).

Optional Components

The hard coat layer according to the present invention comprises the above components. Optional components may be added to enhance the optical property function of the hard coat layer.

Initiator

In the present invention, polymerization initiators include acetophenones, benzophenones, thioxanthones, benzoins, benzoin methyl ethers, aromatic diazonium salts, aromatic sulfonium salts, aromatic iodonium salts, metallocene compounds, and benzoin sulfonic esters. They may be used either solely or in a combination of two or more.

Any initiator may be used. Preferably, the initiator comprises both a polymerization initiator having an absorption coefficient of not more than 100 (ml/g·cm) at a long wavelength of not less than 365 nm and a polymerization initiator having an absorption coefficient of more than 100 (ml/g·cm) at a long wavelength of not less than 365 nm. Specific examples of polymerization initiators having an absorption coefficient of not more than 100 (ml/g·cm) at a long wavelength of not less than 365 nm include commercially available products such as Irgacure 127, Irgacure 184, Irgacure 250, Irgacure 651, IRGACURE 754, Irgacure 907, Irgacure 2959, Darocure 1173, Darocure EDB, and Darocure EHA (manufactured by Chiba Chemical Co., Ltd.), and ESACURE ONE, ESACURE KIP150, and ESACURE 1001M manufactured by LAMBERTI. Specific examples of polymerization initiators having an absorption coefficient of more than 100 (ml/g·cm) at a long wavelength of not less than 365 nm include commercially available products such as Irgacure OXE01, IRGACURE 369, Irgacure 784, Irgacure 819, Irgacure 907, Irgacure 1300, IRGACURE 1800, Darocure 1173, Darocure TPO, Darocure 4265, and CGI 242 (manufactured by Chiba Chemical Co., Ltd.). The content of the photopolymerization initiator is preferably not less than 0.1 part by mass and not more than 10 parts by mass based on 100 parts by mass of the solid matter of the resin in the composition for hard coat layer formation. Further, the same polymerization accelerator as in the low-refractive index layer may be used together with the polymerization initiator in an amount of approximately not less than 0.1 part by weight and not more than 5 parts by weight.

Stabilizer

In a preferred embodiment of the present invention, the composition for a hard coat layer contains a stabilizer. The stabilizer can suppress a deterioration in the components constituting the hard coat layer caused by a change in weather or with the elapse of time. It is particularly considered that the addition of the stabilizer can suppress a change in color of the hard coat layer, particularly yellowing, caused by light or heat. When the stabilizer is mainly used for discoloration preventive purposes, the stabilizer may be a discoloration preventive agent.

Specific examples of stabilizers include hindered amine-type stabilizers (HALS), benzotriazole-type stabilizers, hindered phenolic-type stabilizers, triazine-type stabilizers, phosphorus-type antioxidants, and thioether-type antioxidants. Preferred are hindered amine-type stabilizers (HALS) and benzotriazole-type stabilizers.

The molecular weight of the stabilizer is not limited regardless of whether or not the stabilizer per se has a reactive group and when the stabilizer is a polymeric material. When the stabilizer per se does not contain a reactive group, preferably, the stabilizer has a molecular weight of not less than 1000. When the stabilizer has a molecular weight of not less than 1000, the stabilizer can exhibit satisfactory properties as a stabilizer within the hard coat layer.

The amount of the stabilizer added may be properly determined depending upon the purposes. Preferably, the addition amount of the stabilizer is not more than 20 parts by weight, more preferably not more than 5 parts by weight, based on the total amount of the composition for a hard coat layer. When the addition amount of the stabilizer is in the above-defined range, the stabilization effect of the stabilizer can be satisfactorily attained and, at the same time, the resin in the hard coat layer can be satisfactorily cured. As a result, the desired hard coat properties of the hard coat layer can be realized.

The stabilizer may be a commercially available product, and specific examples thereof include RUVA 93 (manufactured by Otsuka Chemical Co., Ltd.); Vanaresin UVA-1025S, Vanaresin UVA-1050G, and Vanaresin HAL-11025S (manufactured by Shin-Nakamura Chemical Co., Ltd.); FA711MN and FA712HM (manufactured by Hitachi Chemical Co., Ltd.); RSA0113M (manufactured by Sannan Chemical Industry Co., Ltd.); ADK STAB Series manufactured by ADECA CORPORATION, for example, ADK STAB A022, ADK STAB A030, ADK STAB AO40, ADK STAB AO50, ADK STAB A060, ADK STAB AO70, ADK STAB AO80, ADK STAB AO330, ADK STAB A611, ADK STAB A612, ADK STAB A613, ADK STAB A051, ADK STAB A015, ADK STAB A018, ADK STAB 328, ADK STAB A037, ADK STAB PEP4C, ADK STAB PEP8, ADK STAB PEP8W, ADK STAB PEP24G, ADK STAB PEP36, ADK STAB PEP36Z, ADK STAB HP10, ADK STAB 2112, ADK STAB 260, ADK STAB 522, ADK STAB 1178, ADK STAB 1500, ADK STAB 135A, ADK STAB 3010, ADK STAB TPP, ADK STAB A023, ADK STAB A0412S, ADK STAB A0503, ADK STAB LA32, ADK STAB LA36, ADK STAB 1413, ADK STAB LA51, ADK STAB LA52, ADK STAB LA57, ADK STAB LA62, ADK STAB LA63, ADK STAB LA67, ADK STAB LA77, ADK STAB LA82, ADK STAB LA87, ADK STAB LA501, ADK STAB LA502, ADK STAB LA503, ADK STAB LA601, and ADK STAB LA602; TINUVIN Series manufactured by Chiba Specialty chemicals, K.K., for example, TINUVIN-PS, TINUVIN99-2, TINUVIN109, TINUVIN328, TINUVIN384-2, TINUVIN400, TINUVIN411L, TINUVIN900, TINUVIN928, TINUVIN1130, TINUVIN111FDL, TINUVIN123, TINUVIN144, TINUVIN292, and TINUVIN405; IRGANOX Series manufactured by NAGASE & CO., LTD., for example, IRGANOX245, IRGANOX259, IRGANOX565, IRGANOX1010, IRGANOX1076, IRGANOX1098, IRGANOX1222, IRGANOX1330, IRGANOX1425, IRGANOX3114, IRGANOX5057, IRGANOX1520, IRGANOX1135, and IRGANOX1035; and Sumilizer Series manufactured by Sumitomo Chemical Co., Ltd., for example, Sumilizer GA80 and Sumilizer GS; and mixtures of two or more of the above products. Among them, particularly preferred are RUVA93 (manufactured by Otsuka Chemical Co., Ltd.), Vanaresin UVA-1025S and Vanaresin UVA-1050G (all the above products being manufactured by Shin-Nakamura Chemical Co., Ltd.), FA711MN and FA712HM (all the above products being manufactured by Hitachi Chemical Co., Ltd.), and TINUVIN292 and TINUVIN123 (manufactured by Chiba Specialty chemicals, K.K.) and mixtures of two or more of the above products.

Other Agents

The hard coat layer may contain other agents, for example, antistatic agents, contamination preventive agents or anti-dazzling agents from the viewpoint of providing desired optical properties. In this case, other agents may be added to the composition for a hard coat layer to form a hard coat layer.

Electroconductive Agent (Antistatic Agent)

Dust adhesion to the surface of the optical laminate can be effectively prevented by adding an electroconductive agent (antistatic agents). Specific examples of electroconductive agents (antistatic agents) include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, poloymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent.

Further, electroconductive fine particles may be mentioned as the antistatic agent. Specific examples of electroconductive fine particles include fine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

Electroconductive polymers may be mentioned as the antistatic agent, and specific examples thereof include: aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

The amount of the antistatic agent added may be properly determined. For example, the amount of the antistatic agent added is not less than 0.01 part by weight and not more than 50 parts by weight based on the total amount of the composition for a hard coat layer. Preferably, the lower limit of the amount of the antistatic agent added is 0.1 part by weight, and the upper limit of the amount of the antistatic agent added is 25 parts by weight.

Other Antistatic Agent (Electroconductive Agent)

The anti-dazzling layer according to the present invention may contain an antistatic agent (an electroconductive agent) other than described above. Specific examples of electroconductive agents (antistatic agents) include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metal chelate moiety and are polymerizable upon exposure to ionizing radiations, or organometallic compounds such as functional group-containing coupling agents may also be used as the antistatic agent.

Further, electroconductive fine particles may be mentioned as the antistatic agent. Specific examples of electroconductive fine particles include fine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

Electroconductive polymers may be mentioned as the antistatic agent. The electroconductive polymer is not particularly limited, and an example thereof is at least one polymer selected from the group consisting of aliphatic conjugated polyacetylenes, polyacene, polyazulene, aromatic conjugated polyphenylenes, heterocyclic conjugated polypyrroles, polythiophenes, polyisothianaphthenes, heteroatom-containing conjugated polyanilines, polythienylenevinylenes, mixture-type conjugated poly(phenylenevinylenes), double-chain conjugated systems which are conjugated systems having a plurality of conjugated chains in the molecule thereof, derivatives of these electroconductive polymers, and electroconductive composites which are polymers prepared by grafting or block-copolymerizing the above conjugated polymer chain onto a saturated polymer. Among others, the use of organic antistatic agents such as polythiophene, polyaniline, and polypyrrole is more preferred. The use of the organic antistatic agent can realize the development of excellent antistatic properties and, at the same time, can enhance the total light transmittance of the optical laminate, and can lower the haze value. Further, with a view to improving the electroconductivity and improving the antistatic properties, anions of an organic sulfonic acid, iron chloride or the like may also be added as a dopant (an electron donating agent). Based on dopant addition effect, polythiophene has a high level of transparency and a high level of antistatic properties and thus is particularly preferred. Oligothiophene is also suitable as the polythiophene. The above derivatives are not particularly limited, and examples thereof include alkyl substitutes of polyphenylacetylene and polydiacetylene.

Anti-dazzling Agent

Fine particles may be mentioned as the anti-dazzling agent. The fine particles may be, for example, in a truly spherical or elliptical form, preferably in a truly spherical form. The fine particles may be of an inorganic type or an organic type. The fine particles exhibit anti-dazzling properties and are preferably transparent. Specific examples of fine particles include inorganic fine particles, for example, silica beads, and organic fine particles, for example, plastic beads. Transparent fine particles are more preferred. Specific examples of plastic beads include styrene beads (refractive index 1.59), melamine beads (refractive index 1.57), acrylic beads (refractive index 1.49), acryl-styrene beads (refractive index 1.54), polycarbonate beads, and polyethylene beads.

In adding the anti-dazzling agent, the addition of an anti-settling agent is preferred. The addition of the anti-settling agent can realize the suppression of the settling of the resin beads and can realize uniform dispersion of the resin beads in the solvent. Specific examples of anti-settling agents include silica beads and polyethylene beads having a particle diameter of approximately not more than 0.5 μm, preferably 0.1 to 0.25 μm.

Other Plastic Bead Anti-dazzling Agents

Specific examples of other plastic polymer beads include polystyrene beads (refractive index 1.60), melamine beads (refractive index 1.57), acrylic beads (refractive index 1.49 to 1.535), acryl-styrene beads (refractive index 1.54 to 1.58), benzoguanamine-formaldehyde condensate beads (refractive index 1.66), benzoguanamine melamine formaldehyde condensate beads (refractive index 1.52 to 1.66), melamine formaldehyde condensate beads (refractive index 1.66), polycarbonate beads, and polyethylene beads. Preferably, the plastic bead has a hydrophobic group on its surface, and, for example, styrene beads may be mentioned. For example, spherical silica and amorphous silica may be mentioned as the inorganic fine particle. Further, for example, beads of silica-acryl composite compound which is an organic-inorganic composite compound (refractive index 1.52) may also be used.

The amount of the anti-dazzling gent may be properly determined. For example, the amount of the anti-dazzling agent added is not less than 0.001 part by weight and not more than 75 parts by weight, based on the total amount of the composition for a hard coat layer. Preferably, the lower limit of the amount of the anti-dazzling agent added is 0.01 part by weight, and the upper limit of the amount of the anti-dazzling agent added is 50 parts by weight.

Light Transparent Base Material

The light transparent base material may be transparent, semitransparent, colorless, or colored so far as it is transparent to light. Preferably, the light transparent base material is colorless and transparent. Specific examples of light transparent base materials include glass plates; and thin films of triacetate cellulose (TAC), polyethylene terephthalate (PET), diacetylcellulose, cellulose acetate butyrate, polyethersulfone, acrylic resin; polyurethane resin; polyester; polycarbonate; polysulfone; polyether; trimethylpentene; polyether ketone; (meth)acrylonitrile, norbornene resin and the like. In a preferred embodiment of the present invention, triacetate cellulose (TAC) is preferred as the light transparent base material. The thickness of the light transparent base material is approximately 30 μm to 200 μm, preferably 40 μm to 200 μm.

Preferred Light Transparent Base Material

In a preferred embodiment of the present invention, the light transparent base material is smooth and resistant to heat and has excellent mechanical strength. Specific examples of materials usable for the light transparent base material formation include thermoplastic resins, for example, polyesters (polyethylene terephthalate, polyethylene naphthalate, polybutylene terephthalate, and polybutylene naphthalate), cellulose triacetate, cellulose diacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, and polyurethane. Preferred are polyesters (polyethylene terephthalate and polyethylene naphthalate) and cellulose triacetate.

The light transparent base material is preferably used as a highly flexible film of a thermoplastic resin. Depending upon the form of use where curability is required, plate-like materials such as plates of these thermoplastic resins or glass plates are also usable.

Films of amorphous olefin polymers (cycloolefin polymers: COPs) having an alicyclic structure may also be mentioned as other examples of the light transparent base material, and these are base materials using norbornene polymers, monocyclic olefinic polymers, cyclic conjugated diene polymers, vinyl alicyclic hydrocarbon polymers and the like.

Examples thereof include Zeonex and ZEONOR (norbornene resins) manufactured by Zeon Corporation, Sumilight FS-1700 manufactured by Sumitomo Bakelite Co., Ltd., ARTON (modified norbornene resin) manufactured by JSR Corporation, APL (cyclic olefin copolymer) manufactured by Mitsui Chemicals Inc., Topas (cyclic olefin copolymer) manufactured by Ticona, and Optlet OZ-1000 Series (alicyclic acrylic resins) manufactured by Hitachi Chemical Co., Ltd. Further, FV Series (low birefringent index and low photoelastic films) manufactured by Asahi Kasei Chemicals Corporation are also preferred as base materials alternative to triacetylcellulose.

When the light transparent base material is a plate-like material, the thickness may be above the upper limit of the above-defined thickness range, that is, not less than 300 µm and not more than 5000 µm. In forming a hard coat layer, an antistatic layer and the like on the light transparent base material, the base material may be previously subjected to physical treatment such as corona discharge treatment or oxidation treatment or may be previously coated with an anchoring agent or a coating material known as a primer from the viewpoint of improving the adhesion.

Other Layers

Preferably, the optical laminate according to the present invention further comprises an antistatic layer, an anti-dazzling layer, or a contamination preventive layer provided between layers constituting the optical laminate or on the outermost surface of the optical laminate from the viewpoint of developing desired optical properties. In a preferred embodiment of the present invention, an antistatic layer is provided between the low-refractive index layer and the hard coat layer.

Antistatic Layer

The antistatic layer may be formed of an antistatic agent and a resin. The antistatic agent may be the same as that described above in connection with the hard coat layer. The resin may be the same as that described above in connection with the low-refractive index layer. The antistatic layer comprises an antistatic agent, a resin, and a solvent. The thickness of the antistatic layer is preferably about 30 nm to 1 µm. In the formation of the antistatic layer, the surface resistivity value of the antistatic layer is preferably brought to not more than $5 \times 10^7$ $\Omega/cm^2$.

Anti-dazzling Layer

The anti-dazzling layer may be formed of an anti-dazzling agent and a resin. The anti-dazzling agent may be the same as that described above in connection with the hard coat layer. The resin and the solvent may be the same as those described above in connection with the low-refractive index layer.

II. Production Process of Optical Laminate

Preparation of Compositions for Individual Layers

The composition for each layer may be prepared by mixing the above-described components together for dispersion by a conventional preparation method. The mixing/dispersing can be properly carried out, for example, in a paint shaker or a bead mill. The dispersed composition for each layer may be then filtered.

Layer Formation Method

Specific examples of methods for each layer formation include various methods, for example, spin coating, dip coating, spray coating, slide coating, bar coating, roll coating, meniscus coating, flexographic printing, screen printing, and bead coating. A curing-type resin composition may be cured by electron beam or ultraviolet light irradiation. In the case of the electron beam curing, for example, electron beams having an energy of 100 KeV to 300 KeV are used. On the other hand, in the case of ultraviolet curing, for example, ultraviolet light contained in light emitted from ultra-high-pressure mercury lamps, high-pressure mercury lamps, low-pressure mercury lamps, carbon arc lamps, xeon arc lamps, and metal halide lamps is used.

III. Utilization of Optical Laminate

The optical laminate produced by the process according to the present invention may be used as an antireflection laminate and further may be used in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from the low-refractive index layer faces the surface of the polarizing element.

The polarizing element may comprise, for example, polyvinyl alcohol films, polyvinyl formal films, polyvinyl acetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

In a further embodiment of the present invention, there is provided an image display device. The image display device comprises a transmission display and a light source device for applying light to the transmission display from its back side. The optical laminate according to the present invention or the polarizing plate according to the present invention is provided on the surface of the transmission display. The image display device according to the present invention may basically comprise a light source device (backlight), a display element, and the optical laminate according to the present invention. The image display device is utilized in transmission display devices, particularly in displays of televisions, computers, word processors and the like. Among others, the image display device is used on the surface of displays for high-definition images such as CRTs and liquid crystal panels.

When the image display device according to the present invention is a liquid crystal display device, light emitted from the light source device is applied through the lower side of the optical laminate according to the present invention. In STN-type liquid crystal display devices, a phase difference plate may be inserted into between the liquid crystal display element and the polarizing plate. If necessary, an adhesive layer may be provided between individual layers in the liquid crystal display device.

EXAMPLES

The following Examples further illustrate the present invention. However, it should be noted that the contents of the present invention are not limited by these Examples.

Preparation of Compositions for Low-refractive Index Layer

The following components were thoroughly mixed together in a mixer according to the following formulation, and the mixture was filtered to prepare a composition for a low-refractive index layer.

Composition 1 for Low-refractive Index Layer

| | |
|---|---|
| Treated empty silica sol fine particles*) | 14.3 pts. wt. |
| Pentaerythritol triacrylate (PETA) | 1.95 pts. wt. |
| Irgacure 369 (manufactured by Ciba Specialty Chemicals, K.K.) | 0.07 pt. wt. |
| Modified-silicone oil X22-176F (manufactured by The Shin-Etsu Chemical Co., Ltd.) | 0.15 pt. wt. |
| Methyl isobutyl ketone | 73 pts. wt. |
| N-Butanol | 21 pts. wt. |

*)Empty silica sol was treated with a 20% methyl isobutyl ketone solution (the same shall apply hereinafter).

Composition 2 for Low-refractive Index Layer

| | |
|---|---|
| Treated empty silica sol fine particles*) | 14.3 pts. wt. |
| Pentaerythritol triacrylate (PETA) | 1.95 pts. wt. |
| Irgacure 369 (manufactured by Ciba Specialty Chemicals, K.K.) | 0.07 pt. wt. |
| Modified-silicone oil X22-176F (manufactured by The Shin-Etsu Chemical Co., Ltd.) | 0.20 pt. wt. |
| Methyl isobutyl ketone | 73 pts. wt. |
| N-Butanol | 21 pts. wt. |

Composition 3 for Low-refractive Index Layer

| | |
|---|---|
| Treated empty silica sol fine particles*) | 14.3 pts. wt. |
| Pentaerythritol triacrylate (PETA) | 1.95 pts. wt. |
| Irgacure 369 (manufactured by Ciba Specialty Chemicals, K.K.) | 0.07 pt. wt. |
| Modified-silicone oil X22-164E (manufactured by The Shin-Etsu Chemical Co., Ltd.) | 0.20 pt. wt. |
| Methyl isobutyl ketone | 73 pts. wt. |
| N-Butanol | 21 pts. wt. |

Composition 4 for Low-refractive Index Layer

| | |
|---|---|
| Treated empty silica sol fine particles*) | 14.3 pts. wt. |
| Pentaerythritol triacrylate (PETA) | 1.95 pts. wt. |
| Irgacure 369 (manufactured by Ciba Specialty Chemicals, K.K.) | 0.07 pt. wt. |
| Modified-silicone oil Silaplane FM725 (manufactured by Chisso Corp.) | 0.20 pt. wt. |
| Methyl isobutyl ketone | 73 pts. wt. |
| N-Butanol | 21 pts. wt. |

Composition 5 for Low-refractive Index layer

| | |
|---|---|
| Treated empty silica sol fine particles*) | 14.3 pts. wt. |
| Pentaerythritol triacrylate (PETA) | 1.95 pts. wt. |
| Irgacure 369 (manufactured by Ciba Specialty Chemicals, K.K.) | 0.07 pt. wt. |
| Modified-silicone oil TSF4421 (manufactured by GE Toshiba Silicones) | 0.20 pt. wt. |
| Methyl isobutyl ketone | 73 pts. wt. |
| N-Butanol | 21 pts. wt. |

Composition 6 for Low-refractive Index Layer

| | |
|---|---|
| Treated empty silica sol fine particles*) | 14.3 pts. wt. |
| Pentaerythritol triacrylate (PETA) | 1.95 pts. wt. |
| Irgacure 369 (manufactured by Ciba Specialty Chemicals, K.K.) | 0.07 pt. wt. |
| Methyl isobutyl ketone | 73 pts. wt. |
| N-Butanol | 21 pts. wt. |

Composition 7 for Low-refractive Index Layer

| | |
|---|---|
| Treated empty silica sol fine particles*) | 14.3 pts. wt. |
| Pentaerythritol triacrylate (PETA) | 1.95 pts. wt. |
| Irgacure 127 (manufactured by Ciba Specialty Chemicals, K.K.) | 0.07 pt. wt. |
| Modified-silicone oil X22-164E (manufactured by The Shin-Etsu Chemical Co., Ltd.) | 0.20 pt. wt. |
| Methyl isobutyl ketone | 73 pts. wt. |
| PGME | 21 pts. wt. |

Composition 8 for Low-refractive Index Layer

| | |
|---|---|
| Treated empty silica sol fine particles*) | 14.3 pts. wt. |
| Pentaerythritol triacrylate (PETA) | 0.45 pt. wt. |
| LINC3A (manufactured by Kyoeisha Chemical Co., Ltd.) | 1.5 pts. wt. |
| Irgacure 127 (manufactured by Ciba Specialty Chemicals, K.K.) | 0.06 pt. wt. |
| LunaOMB (manufactured by Lambson Group LTD) | 0.01 pt. wt. |
| Modified-silicone oil FM7726 (manufactured by Chisso Corp.) | 0.20 pt. wt. |
| Methyl isobutyl ketone | 73 pts. wt. |
| PGMEA | 21 pts. wt. |

Preparation of Compositions for Hard Coat Layer

The following components for hard coat layer were thoroughly mixed together in a mixer according to the following formulation, and the mixture was filtered to prepare a composition for a hard coat layer.

Composition 1 for Hard Coat Layer

| | |
|---|---|
| Urethane acrylate resin (manufactured by Nippon Synthetic Chemical Industry Co., Ltd., UV1700B) | 5 pts. wt. |
| Polyester acrylate resin (manufactured by TOAGOSEI CO., LTD., M9050) | 5 pts. wt. |
| Polymerization initiator (IRGACURE 184) | 0.4 pt. wt. |
| Methyl ethyl ketone (herein after referred to as "MEK") | 10 pts. wt. |

Composition 2 for Hard Coat Layer

| | |
|---|---|
| Bis[(2-methacryloylthio)ethyl]sulfide (manufactured by Sumitomo Chemical Engineering Co., Ltd.; S2EG) | 5 pts. wt. |
| Dipentaerythritol hexaacrylate (manufactured by Nippon Kayaku Co., Ltd., DPHA) | 3 pts. wt. |
| Polyester acrylate (manufactured by TOAGOSEI CO., LTD., M9050) | 2 pts. wt. |

-continued

| Polymerization initiator (IRGACURE 184) | 0.3 pt. wt. |
| Polymerization initiator (DAROCUR TPO) | 0.3 pt. wt. |
| MEK | 10 pts. wt. |

Composition 3 for Hard Coat Layer

| Urethane acrylate resin (manufactured by Nippon Synthetic Chemical Industry Co., Ltd., UV1700B) | 2 pts. wt. |
| Polyester acrylate resin (manufactured by TOAGOSEI CO., LTD., M9050) | 2 pts. wt. |
| Urethane acrylate resin (manufactured by Arakawa Chemical Industries, Ltd., BS371) | 4 pts. wt. |
| Dipentaerythritol hexaacrylate (DPHA) | 2 pts. wt. |
| Polymerization initiator (IRGACURE 184) | 0.4 pt. wt. |
| MEK | 10 pts. wt. |

Composition 4 for Hard Coat Layer

| Urethane acrylate resin (manufactured by Nippon Synthetic Chemical Industry Co., Ltd., UV1700B) | 3 pts. wt. |
| Dipentaerythritol hexaacrylate (manufactured by Nippon Kayaku Co., Ltd., DPHA) | 2 pts. wt. |
| Urethane acrylate resin (manufactured by Arakawa Chemical Industries, Ltd., BS371) | 2 pts. wt. |
| Surface treated colloidal silica (average particle diameter of about 90 nm) | 3 pts. wt. |
| Polymerization initiator (IRGACURE 184) | 0.4 pt. wt. |
| MEK | 10 pts. wt. |

Production of Optical Laminates

Example 1

Formation of Hard Coat Layer

Composition 1 for a hard coat layer was coated on one side of a cellulose triacetate film (thickness 80 μm) at a coverage of 20 g/m² on a wet basis (10 g/m² on a dry basis). The coated film was dried at 50° C. for 30 sec and was irradiated with ultraviolet light at 50 mJ/cm² to form a hard coat layer.

Formation of Low-refractive Index Layer

The composition for a low-refractive index layer (composition 1 for a low-refractive index layer) was coated on the surface of the hard coat layer, and the coating was cured by ultraviolet irradiation at an exposure of 192 mJ/m² with an ultraviolet light irradiation device (manufactured by Fusion UV Systems Japan KK., light source H bulb) and was dried (40° C. for 1 min) to form a low-refractive index layer having a thickness of 0.1 μm and having a minimum reflectance value around a wavelength of 550 nm. Thus, an optical laminate was produced.

Example 2

An optical laminate was produced in the same manner as in Example 1, except that the composition for a low-refractive index layer was changed to composition 2 for a low-refractive index layer.

Example 3

An optical laminate was produced in the same manner as in Example 1, except that the composition for a hard coat layer was changed to composition 2 for a hard coat layer.

Example 4

An optical laminate was produced in the same manner as in Example 1, except that the composition for a low-refractive index layer was changed to composition 3 for a low-refractive index layer.

Example 5

An optical laminate was produced in the same manner as in Example 1, except that the composition for a low-refractive index layer was changed to composition 4 for a low-refractive index layer.

Example 6

An optical laminate was produced in the same manner as in Example 1, except that the composition for a low-refractive index layer was changed to composition 7 for a low-refractive index layer and the composition for a hard coat layer was changed to composition 3 for a hard coat layer.

Example 7

An optical laminate was produced in the same manner as in Example 1, except that the composition for a low-refractive index layer was changed to composition 8 for a low-refractive index layer and the composition for a hard coat layer was changed to composition 4 for a hard coat layer.

Comparative Example 1

An optical laminate was produced in the same manner as in Example 1, except that the composition for a low-refractive index layer was changed to composition 5 for a low-refractive index layer.

Comparative Example 2

An optical laminate was produced in the same manner as in Example 1, except that the composition for a low-refractive index layer was changed to composition 6 for a low-refractive index layer.

Evaluation Tests

The optical laminates of Examples and Comparative Examples were subjected to the following evaluation tests, and the results are shown in Table 1 below.

Evaluation 1: Evaluation of Contamination Preventive Properties

Water was dropped on the surface of the hard coat layer in the optical laminate, and the contact angle of the surface of the hard coat layer in the optical laminate with water was measured.

⊚: Contact angle with water of not less than 90° x: Contact angle with water of less than 90°

Evaluation 2: Measurement of Percentage Presence of Organosilicon Atom by XPS

An XPS (X-ray photoelectron spectroscopic) measuring apparatus manufactured by Thermo Electron Corporation (VG Theta Probe) was provided. The percentage presence (%) of organosilicon atoms was measured using this apparatus under conditions of X-ray source: monochromated Al Kα, X-ray output: 100 W, measuring region: 400 μmφ, lens: angle resolved, and measuring angle: three stages (31°, 46°, and 61°). The percentage presence of inorganic silicon atoms (O—Si—O) was excluded. When the measuring angle was 310, the organosilicon atom was present in a range from the outermost surface to a position of 50 angstroms from the outermost surface. When the measuring angle was 46°, the organosilicon atom was present in a range from the outermost surface to a position of 70 angstroms from the outermost surface. When the measuring angle was 61°, the organosilicon atom was present in a range from the outermost surface to a position of 87 angstroms from the outermost surface.

|  | Evaluation | | | |
|---|---|---|---|---|
|  |  | Evaluation 2 | | |
| Ex. | Evaluation 1 | 31° | 46° | 61° |
| Ex. 1 | ◉ | 18 | 14 | 11 |
| Ex. 2 | ◉ | 18 | 16 | 13 |
| Ex. 3 | ◉ | 25 | 20 | 18 |
| Ex. 4 | ◉ | 16 | 14 | 12 |
| Ex. 5 | ◉ | 16 | 14 | 12 |
| Ex. 6 | ◉ | 20 | 15 | 11 |
| Ex. 7 | ◉ | 17 | 13 | 10 |
| Comp. Ex. 1 | X | 8 | 6 | 5 |
| Comp. Ex. 2 | ◉ | 0 | 0 | 0 |

The invention claimed is:

1. An optical laminate comprising a light-transparent base material, and a hard coat layer and a low-refractive index layer provided in that order on the light-transparent base material, wherein
the low-refractive index layer has a refractive index of not more than 1.5,
the low-refractive index layer contains a contamination preventive agent and/or a slipperiness imparting agent, and
the contamination preventive agent and/or slipperiness imparting agent as additives are added so that the concentrations of the contamination preventive agent and/or slipperiness imparting agent are increased from the surface of the hard coat layer toward the surface of the low-refractive index layer,
wherein the contamination preventive agent and/or slipperiness imparting agent is a fluorocompound represented by general formula:

(A)w-(B)x-(D)y-CF$_3$ wherein
A represents one or at least two groups selected from the group consisting of CF$_2$, CFCF$_2$, and C(CF$_2$)$_2$;
B represents one or at least two groups selected from the group consisting of OCF$_2$CF$_2$, OCF$_2$CF(CF$_2$), OCF$_2$C(CF$_2$)$_2$, OCF(CF$_2$CF(CF$_2$), OCF(CF$_2$)C(CF$_2$)$_2$, OC(CF$_2$)$_2$CF(CF$_2$), and OC(CF$_2$)$_2$C(CF$_2$)$_2$;
D represents one or at least two groups selected from the group consisting of OCH$_2$CH$_2$, OCH$_2$CH$_2$CH$_2$, and OC(O)(CH$_2$)z; and
w, x, y, and z are a number of more than 0 and not more than 50.

2. The optical laminate according to claim 1, wherein the contamination preventive agent and/or the slipperiness imparting agent further comprises silicon compounds.

3. The optical laminate according to claim 2, wherein the silicon compound is a compound represented by general formulae (I) to (III) or (IV):

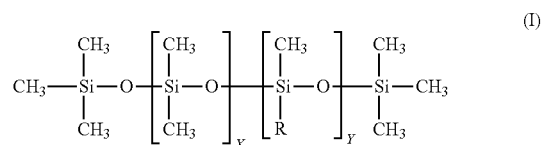

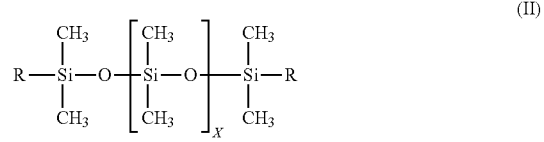

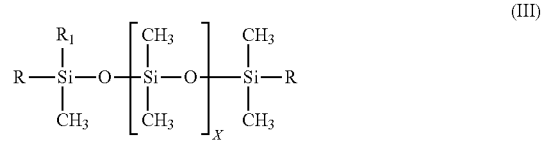

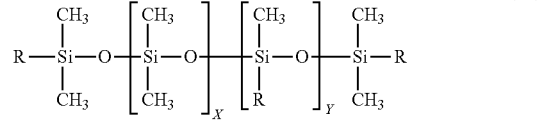

wherein
R represents a methyl group, a fluorine atom, an acryl group, a methacryl group, a hydroxyl group, a carboxyl group, a polyether group, or an epoxy group;
R$_1$ represents an alkyl group;
X is 0 to 1200; and
Y is 0 to 1200.

4. The optical laminate according to claim 2, wherein, when the outermost surface of the low-refractive index layer is analyzed by XPS, the percentage presence of fluorine atoms is not less than 20%.

5. The optical laminate according to claim 1, wherein the low-refractive index layer and/or the hard coat layer contains an antistatic agent or an anti-dazzling agent.

6. The optical laminate according to claim 1, which further comprises an antistatic layer provided on the underside of the hard coat layer or between the low-refractive index layer and the hard coat layer.

7. The optical laminate according to claim 1, wherein the hard coat layer comprises a monomer having a 9,9-bisphenoxy fluorene skeleton containing one or more functional groups and/or a monomer containing two or more sulfur atoms.

8. The optical laminate according to claim 1, for use as an antireflection laminate.

9. A polarizing plate comprising a polarizing element, wherein
an optical laminate according to claim 1 is provided on the surface of the polarizing element so that the surface of the polarizing element faces the optical laminate on its side remote from the low-refractive index layer.

10. An image display device comprising: a transmission display; and a light source device for applying light to the transmission display from its backside, wherein
an optical laminate according to claim 1 is provided on the surface of the transmission display.

11. An image display device comprising: a transmission display; and a light source device for applying light to the transmission display from its backside, wherein a polarizing plate according to claim 9 is provided on the surface of the transmission display.

12. The optical laminate according to claim 1, wherein, when the outermost surface of the low-refractive index layer is analyzed by XPS, the percentage presence of fluorine atoms is not less than 20%.

13. The optical laminate according to claim 2, wherein, when the outermost surface of the low-refractive index layer is analyzed by XPS, the percentage presence of silicon atoms is not less than 10%.

14. The optical laminate according to claim 3, wherein, when the outermost surface of the low-refractive index layer is analyzed by XPS, the percentage presence of silicon atoms is not less than 10%.

15. The optical laminate according to claim 2, wherein the low-refractive index layer and/or the hard coat layer contains an antistatic agent or an anti-dazzling agent.

16. The optical laminate according to claim 2, which further comprises an antistatic layer provided on the underside of the hard coat layer or between the low-refractive index layer and the hard coat layer.

17. The optical laminate according to claim 2, wherein the hard coat layer comprises a monomer having a 9,9-bisphenoxy fluorene skeleton containing one or more functional groups and/or a monomer containing two or more sulfur atoms.

18. The optical laminate according to claim 2, for use as an antireflection laminate.

19. A polarizing plate comprising a polarizing element, wherein
an optical laminate according to claim 2 is provided on the surface of the polarizing element so that the surface of the polarizing element faces the optical laminate on its side remote from the low-refractive index layer.

20. An image display device comprising: a transmission display; and a light source device for applying light to the transmission display from its backside, wherein
an optical laminate according to claim 2 is provided on the surface of an image display.

\* \* \* \* \*